United States Patent
Akhtar et al.

(10) Patent No.: US 8,520,584 B2
(45) Date of Patent: Aug. 27, 2013

(54) DATA OVER SIGNALING (DOS) OPTIMIZATION OVER WIRELESS ACCESS NETWORKS

(75) Inventors: Haseeb Akhtar, Garland, TX (US); Krishnakumar Pillai, Lock Haven, PA (US); Hong Ren, Kanata (CA); Carl Cao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/385,215

(22) Filed: Feb. 8, 2012

(65) Prior Publication Data

US 2012/0147806 A1 Jun. 14, 2012

Related U.S. Application Data

(63) Continuation of application No. 12/227,343, filed as application No. PCT/US2007/011531 on May 14, 2007, now Pat. No. 8,125,937.

(60) Provisional application No. 60/800,901, filed on May 16, 2006, provisional application No. 60/800,546, filed on May 15, 2006.

(51) Int. Cl.
*H04H 20/71* (2008.01)

(52) U.S. Cl.
USPC .......................... 370/312; 455/458; 455/518

(58) Field of Classification Search
None
See application file for complete search history.

(56) References Cited

U.S. PATENT DOCUMENTS

| | | | |
|---|---|---|---|
| 6,181,940 B1 * | 1/2001 | Rune | 455/435.2 |
| 2003/0039225 A1 | 2/2003 | Casati et al. | |
| 2005/0009534 A1 | 1/2005 | Harris et al. | |
| 2007/0238442 A1 * | 10/2007 | Mate et al. | 455/403 |

FOREIGN PATENT DOCUMENTS

WO   WO2006002218 A1   1/2006

OTHER PUBLICATIONS

International Searching Authority: Notification of Transmittal of the International Search Report, Written Opinion of Int'l Searching Authority, or the Declaration dated Jan. 31, 2008.
International Searching Authority: International Search Report dated Jan. 31, 2008.
International Searching Authority: Written Opinion of the International Searching Authority dated Jan. 31, 2008.

* cited by examiner

*Primary Examiner* — German Viana Di Prisco
(74) *Attorney, Agent, or Firm* — Meyertons, Hood, Kivlin, Kowert & Goetzel, P.C.

(57) ABSTRACT

The present invention supports a communication protocol on a wireless communication network to transmit application data on the control channel to an access terminal. Base transceiver stations are grouped and configured into paging zones. The radio network controller transmits a page message and application data to the base transceiver stations in the paging zone where the access terminal is located. Each of the base transceiver stations transmits a page and buffers the application data. The buffered application data is only transmitted by the base transceiver station receiving a response to the page.

8 Claims, 4 Drawing Sheets

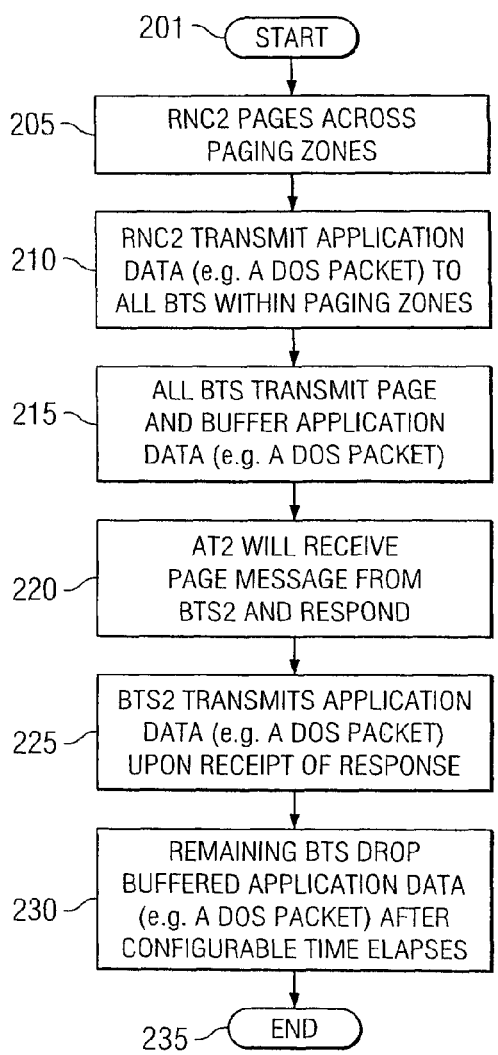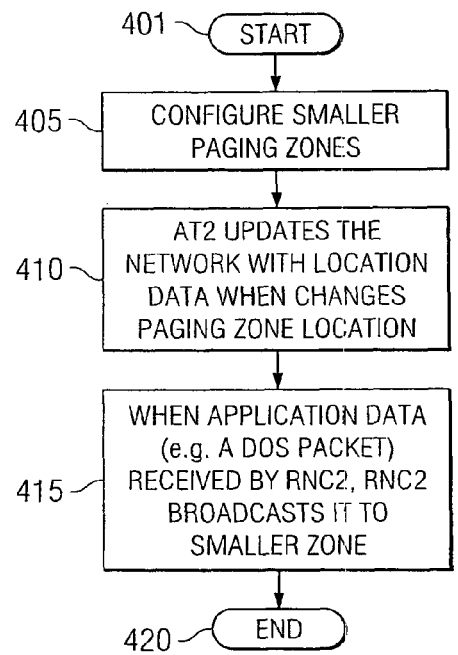

DATA OVER SIGNALING (DOS) OPTIMIZATION OVER WIRELESS ACCESS NETWORKS

RELATED APPLICATION DATA

This application is a Continuation Application of application Ser. No. 12/227,343 filed on Nov. 14, 2008, which is a National Stage filing of PCT Application No. PCT/US2007/011531 filed on May 14, 2007, which is related to U.S. Provisional Patent Application Ser. No. 60/800,546 filed on May 15, 2006, and U.S. Provisional Patent Application Ser. No. 60/800,901 filed on May 16, 2006, and priority is claimed for these earlier filings under 35 U.S.C. §120 and §119.

TECHNICAL FIELD OF THE INVENTION

A method for optimizing the transmission of application data in a packet communication network to maximize the latency of delay sensitive traffic.

BACKGROUND OF THE INVENTION

The Internet, like so many other high tech developments, grew from research originally performed by the United States Department of Defense. In the 1960s, the military had accumulated a large collection of incompatible computer networks. Computers on these different networks could not communicate with other computers across their network boundaries.

In the 1960s, the Defense Department wanted to develop a communication system that would permit communication between these different computer networks. Recognizing that a single, centralized communication system would be vulnerable to attacks or sabotage, the Defense Department required that the communication system be decentralized with no critical services concentrated in vulnerable failure points. In order to achieve this goal, the Defense Department established a decentralized standard communication protocol for communication between their computer networks.

A few years later, the National Science Foundation (NSF) wanted to facilitate communication between incompatible network computers at various research institutions across the country. The NSF adopted the Defense Department's protocol for communication, and this combination of research computer networks would eventually evolve into the Internet.

Internet Protocols

The Defense Department's communication protocol governing data transmission between different networks was called the Internet Protocol (IP) standard. The IP standard has been widely adopted for the transmission of discrete information packets across network boundaries. In fact, the IP standard is the standard protocol governing communications between computers and networks on the Internet.

The IP standard identifies the types of services to be provided to users and specifies the mechanisms needed to support these services. The IP standard also specifies the upper and lower system interfaces, defines the services to be provided on these interfaces, and outlines the execution environment for services needed in the system.

In a typical Internet-based communication scenario, data is transmitted from an originating communication device on a first network across a transmission medium to a destination communication device on a second network. After receipt at the second network, the packet is routed through the network to a destination communication device using standard addressing and routing protocols. Because of the standard protocols in Internet communications, the IP protocol on the destination communication device decodes the transmitted information into the original information transmitted by the originating device.

The IP-Based Mobility System

The Internet protocols were originally developed with an assumption that Internet users would be connected to a single, fixed network. With the advent of cellular wireless communication systems using mobile communication devices, the movement of Internet users within a network and across network boundaries has become common. Because of this highly mobile Internet usage, the implicit design assumption of the Internet protocols (e.g. a fixed user location) is violated by the mobility of the user.

In an IP-based mobile communication system, the mobile communication device (e.g. cellular phone, pager, computer, etc.) can be called a mobile node or mobile station. Typically, a mobile station maintains connectivity to its home network while operating on a visited network. The mobile station will always be associated with its home network for IP addressing purposes and will have information routed to it by routers located on the home and visited networks.

Packet-Based Communication Systems

In Internet Protocol (IP) networks, the communication process is very different from prior conventional telecommunication systems. In an IP network communication, there is no open switched connection established between the caller and recipient devices. The information being transmitted between the caller and recipient devices is broken into packets of data, and each packet of data is transmitted to the recipient device in pieces. The data packets individually contain routing information to direct each packet to the recipient device. These packets are then reassembled into a coherent stream of data at the recipient device.

Code Division Multiple Access (CDMA) is an evolving third generation communication system standard for wireless communication systems that can transmit multimedia services using the packet-based Internet protocol. These CDMA mobile communication systems support multimedia telecommunication services delivering voice (VoIP) and data, to include pictures, video communications, and other multimedia information over mobile wireless connections. These types of communications are typically time-sensitive and require high data rate transfers with inherent delays minimized as much as possible.

As the capability of the various communication standards have improved, there has been an increasing need for high-speed transmissions and increased user capacity. A new CDMA packet air interface has been developed that offers improvements over earlier CDMA systems by implementing high-speed shared-traffic packet data channels on the forward air-link connection. Recent developments include CDMA-based 1xEV systems operating at 1.25 MHz. The 1.25 MHz carrier delivers high data rates and increased voice capacity. 1 xEV is a two-phase strategy. One phase is designated 1xEV-DO, which handles data only. The 1xEV-DO standard provides user with peak data rates of 3.0 Mbits/s. The other phase is 1xEV-DV, for data and voice. Other standards are evolving that also make use of the shared packet channel and multiplex packet communication for high-speed data and voice communication.

In the CDMA standard, Mobile Nodes, or Access Terminals (AT), roam within and across cellular communication sites. Each of the sites, or cells, possesses one or more transceivers coupled to a Base Transceiver Station (BTS) onto the communication network. The BTSs are in turn coupled to an Access Network. As an AT migrates across cellular borders, its BTS physical connection changes. An AT can be physically located anywhere on the network or sub-network, and its routing address data will change and require updating on other nodes. Wireless IP networks handle the mobile nature of AT with hand-off procedures designed to update the communication network and sub-network with the location of the mobile node for packet routing purposes. The latency period in these hand-offs can be prohibitively high. Call setup times can also be excessive as communication pathways are established before transmitting application data.

A new method of delivering application signaling (for example, SIP signaling) to setup a real-time application call like a Push-to-Talk (PTT) call in 1 xEV-DO can significantly reduce the call setup time. Call setup time is an important performance indicator for applications like Push-to-Talk (PTT), Voice over IP (VoIP) and Video Telephony (VT). At the same time, it minimizes the air-link and network resource utilization.

The method for delivering application signaling to setup a real-time application call (like PTT) determines the call setup time. Some methods of delivering application signaling so as to reduce call setup time normally require more air-link and network resource utilization, while other methods attempting to reduce the air-link and network resource utilization often lead to longer call setup time.

The application signaling for call setup can be accomplished in different ways. One method is to setup an air-link connection (or traffic channel) first and then deliver the application signaling over the traffic channel to the specific access terminal (AT). However, this approach invariably results in longer call setup time. In 1xEV-DO, the application signaling can be sent in the form of Data over Signaling (DoS) before a traffic channel is established. Application data destined for a dormant AT is transmitted as a broadcast message to all sectors within a paging zone using the signaling channel. Sending application data over the signaling channel, such as DoS protocol in 1xEV-DO access technology, typically requires a message 10 to 20 times larger than a regular page message (e.g. 211 bytes of application data versus 13 bytes of page message). The page message and application packet may be bundled together, or the application data may be sent separately to indicate a page to the AT. This leads to an overload in the signaling channel used for sending the page message, which for 1xEV-DO is the control channel. Using the control channel for sending application data decreases the bandwidth for sending 10-20 other page messages. The resulting control channel degradation will increase the call blocking rate.

Using DoS, the application signaling can be broadcast to the entire paging zone over the control channel along with the Page message, reducing the call setup time. However, since the application signaling messages are normally much larger than the Page message, the control channel utilization is increased significantly. More significantly, when the paging zone is large, the control channels of many sectors (all the sectors in the paging zone) are impacted. In 1xEV-DO, the forward link uses time division multiplex and the time slots are shared by the traffic channel and the control channel. The increase in control channel usage means a decrease in throughput or capacity as more time slots are devoted to the control channel to the detriment of the traffic channel.

In order to minimize the control channel usage, one approach is to page the AT first. After the access network (AN) receives a page response, the AT's location is known and the application signaling can be sent in the sector that receives the AT's page response. However, this method has the disadvantage of longer call setup time. There is a need for a new method of delivering application signaling that can reduce the call setup time while minimizing the air-link and network resource utilization.

SUMMARY OF THE INVENTION

The invention consists of two parts. In the first part, the radio network controller pages across its primary paging zones. At the same time the page message is transmitted to all the associated BTSs, the application data (e.g., a DoS packet) is transmitted as well to all the BTSs associated with the paging zones (over the backhaul). However, the BTSs will not all transmit the application data along with the page message. Instead, the BTS waits for a page response message. Upon receiving a page response message (e.g. Connection Request), the BTS will forward the application data (e.g., a DoS packet) to the AT over the asynchronous control channel. Other BTSs receiving the application data (e.g., a DoS packet) will drop the packet (e.g., a DoS packet) upon expiration of a configurable time frame.

In an alternative embodiment, the RNC accomplishes these functions in a similar manner. At the same time the page message is transmitted to all the sectors, the DoS packet (i.e., which contains the application data) is transmitted, in a similar manner as the page, as well to all the sectors in the paging zones (over the backhaul). However, the RNC will transmit the page over the control channel only, while withholding the application data for a predetermined period of time. The RNC will wait for a page response to the page that is sent to each sector over the air, and upon receiving the page response (e.g. Connection Request), the RNC would know in which sector the target AT is located and it then forwards the application data (e.g. DoS packet) to the AT over the control channel. This also have the added benefit that the page would have woken up the AT and it will be waiting for receiving additional data more efficiently and more reliably from the RNC over the control channel. The DoS message withheld in all other sectors will be dropped after the timer has expired. Note, in the event that the page response is received from more than one sector, the RNC will still forward the DoS to all the sectors.

There are two possibilities to transmit the DoS to the AT, arising from the fact that the RAN consists of both a RNC and the BTS at each sector. In the first case, the DoS is withheld at the BTS at the site of each sector. In this case, the BTS will transmit the DoS immediately to the target AT immediately upon receiving the page response. In the second case, the DoS is withheld at the RNC. The BTS will first receive the page response, and forward it to the RNC. The RNC will send the DoS to the BTS in response to receiving the page response via the BTS, and then the BTS can forward the DoS to the target AT In the second part, the invention establishes a smaller paging zone. This reduces the number of sectors that transmit the application data (e.g., a DoS packet) over their control channel thus minimizing the capacity impact on valuable RF resources in the forward direction (from BTS to the AT). An important element is to dynamically adjust the paging zone for different users at different time. Specifically, the paging zone is adjusted only for users that are authorized to use real-time applications such as PTT, VoIP and VT etc. The paging zone is also only adjusted for a user when the user starts and closes any application requiring real-time or time-sensitive transmissions. It is also possible to have different paging zones for different applications. For example, the paging zone for a PTT application can differ from the paging zone for a VoIP application.

Additionally, the page zone may be constructed for each user based on the combination of these factors, including the type of the subscribed application, applicable geographical location, and time of the day. Thus, the paging zone only includes a subset of sectors where the user is authorized to use a particular application and during a specific time for the purpose of paging the user for an incoming call of that application. In the case of PTT, for example, it is expected that the user will only be authorized to be engaged in a conversation with group members when the user is in a limited geographical area where the group is located.

BRIEF DESCRIPTION OF THE DRAWINGS

The objects and features of the invention will become more readily understood from the following detailed description and appended claims when read in conjunction with the accompanying drawings in which like numerals represent like elements and in which:

FIG. 2 is a flow diagram showing the method to transmit the DoS packet of the invention;

FIG. 4 is a flow diagram showing the method to refine the paging zones to transmit the DoS packet within of the invention.

DETAILED DESCRIPTION OF THE PREFERRED EMBODIMENTS

Figure 1:
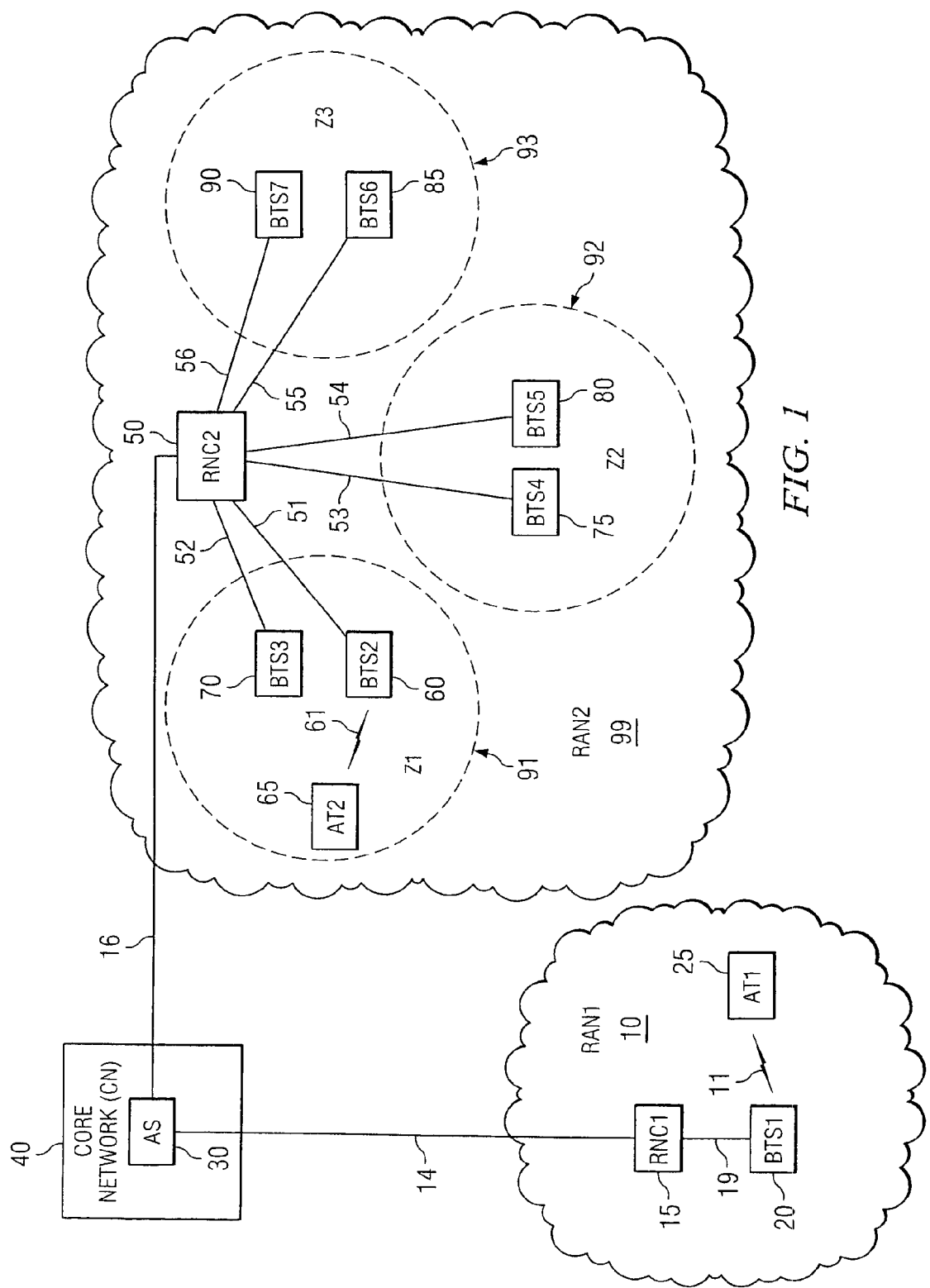
FIG. 1 is a schematic diagram of the functional elements of a wireless communication network compatible with the invention based on an implementing architecture for a CDMA system.

A typical cellular communication system is comprised of multiple cell sites operating over a geographic region or zone. Referring to FIG. 1, Radio Access Network 1 (RAN1) 10 consist of a Radio Network Controller 1 (RNC1) 15 linked to a Base Transceiver Station 1 (BTS1) 20 by communication link 19. RAN1 10 supports wireless communication with mobile stations or access terminals (e.g. cellular phones, smart phones, laptop computers, handheld terminals, etc.) within the coverage area of BTS1 20 (and any other linked Base Transceiver Stations). Radio Signal 11 links the Access Terminal 2 (AT2) 20 to the BTS1 20.

The RNC1 15 is coupled to the Core Network (CN) 40 by communication link 14. The RNC 15 is coupled to an Application Server (AS) 30, which is part of the CN 40, via the communication link 14. The RNC1 15 supports the transmission of voice and data communications on the cellular wireless network, and the RNC1 15 allows for the continuity of transmissions to and from AT1 25 as it roams the wireless network within the communication coverage of RNC1 15. The RNC1 15 will also control other components in the cellular sites to further support the transmission of voice and data on the wireless network. A packet scheduler is a functional component of the RNC1 15, and the RNC1 15 allocates system resources of time, code, or power to the packet data users. Collectively, the RNC1 15 and its associated components are called a Radio Access Network (RAN1 10), but the RNC1 15 can also be individually referred to as a RAN.

The AS 30 on the CN 40 is also coupled to RNC2 50 by communication link 16. RNC2 50 is coupled to six BTSs as shown in FIG. 1. RNC2 50 is coupled to BTS2 60 by communication link 51. BTS 60 is in turn coupled to AT2 65 by radio signal 61. RNC2 50 is also coupled to BTS3 70 by communication link 52. RNC2 50 is coupled to BTS4 75 by communication link 53, and BTS5 80 is also coupled to RNC2 50. RNC2 50 is coupled to BTS6 85 by communication link 55 and to BTS7 90 by communication link 56. BTS2 60 and BTS3 70 are configured to form a zone 1 (Z1 91). BTS4 75 and BTS5 80 are configured to form a zone 2 (Z2 92). BTS5 85 and BTS7 90 are configured to form a zone 3 (Z3 93). Collectively, Z1 91, Z2 92, and Z3 93 together with RNC2 50 form RAN2 99. The zones, or paging zones, can also be configured as cellular sites or sub-sites, which form a larger communication zone or access network that may or may not consist of a single cell for cellular communication.

Communications are initiated by paging an AT within these sub-sites or paging zones. The RNC2 50 supports the transmission of voice and data communications on the cellular wireless network, and the RNC2 50 allows for the continuity of transmissions to and from AT2 65 as it roams the wireless network within the communication coverage of RNC2 50. The RNC2 50 will also control other components in the cellular sites to further support the transmission of voice and data on the wireless network. A packet scheduler is a functional component of the RNC2 50, and the RNC2 50 allocates system resources of time, code, or power to the packet data users. Collectively, the RNC2 50 and its associated components (i.e., the BTS2 60, BTS3 70, BTS4 75, BTS5 80, BTS6 85 and BTS7 90) are called a Radio Access Network (RAN2 99), but the RNC2 50 can also be individually referred to as RAN. Typically, a RNC supports communication within a single cellular coverage area, but as discussed above, other communication zones and coverage can be specified by the architecture.

Although other implementing architectures for the invention may be used, the preferred embodiment uses a CN 40 network coupled to RAN1 10 and RAN2 99 or a similar communication system having an RNC supporting communication in multiple zones. In one prior art method for solving the problem, the RNC2 50 identifies the AT2 65 as the terminating mobile station requires receiving the application data (e.g. a DoS packet). The RNC2 50 broadcasts the application data (e.g., a DoS packet) over its paging zones (e.g. Z1 91, Z2 92, and Z3 93). Roughly one application data packet is equivalent to ten page messages. Communicating application data (e.g., a DoS packet) over the control channel using this method is very cost prohibitive and capacitive intensive, greatly decreasing bandwidth and communication resources.

FIG. 2 is a flow diagram showing the method of the invention to transmit the application data (e.g., a DoS packet) as the first part of the invention. At step 201, the method starts. Referring to the CDMA system of FIG. 1, in step 205, the RNC2 pages across its paging zones, broadcasting a Page message to its coupled BTSs (BTS2, BTS3, BTS4, BTS5, BTS6, and BTS7). At the same time, in step 210, the RNC2 transmits the application data (e.g., a DoS packet) to all BTS within the paging zones. In this embodiment, the DoS packet contains application data. Upon receipt of the application data (e.g., a DoS packet) in step 215, all the BTSs transmit, or broadcast, the Page message and buffer the application data (e.g., a DoS packet). Alternatively, the RNC2 can buffer the application data (e.g., a DoS packet). In step 220, the AT2 will receive the Page message from the BTS2 and responds. In step 225, BTS2 transmits the application data (e.g., a DoS packet) upon receipt of the page response, (such as a Connection Request) message. If the RNC2 is used to buffer the application data (e.g., a DoS packet), the data will be transmitted upon receipt of a page response to the BTS receiving the response. In step 230, the remaining BTSs drop the buffered application data (e.g., a DoS packet) after a configurable time elapses. The method ends at step 235.

Figure 3:
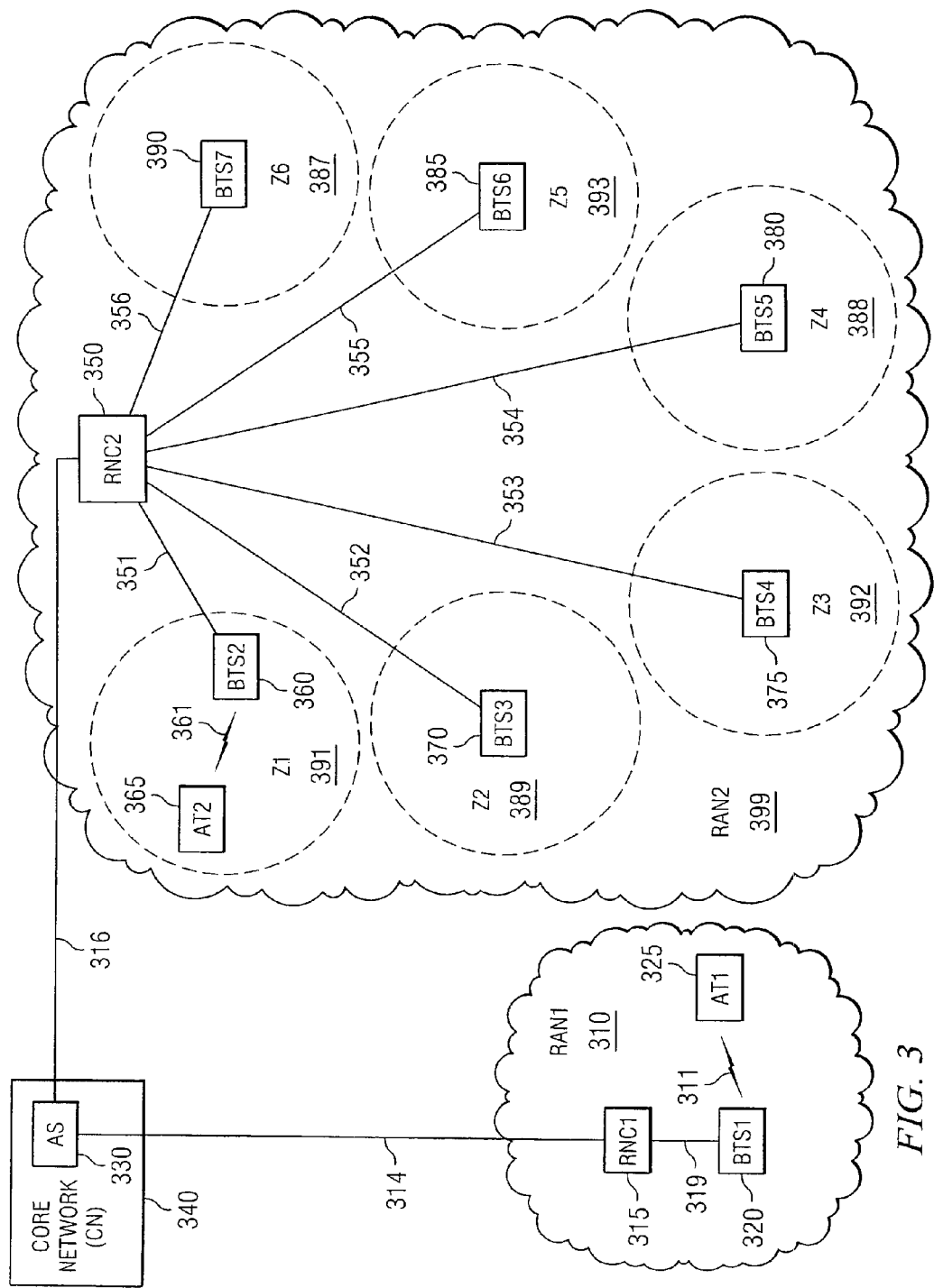
FIG. 3 illustrates the construction of a smaller paging zone in the CDMA system.

FIG. 3 shows the construction of a smaller paging zones using the second part of the invention. Radio Access Network 1 (RAN1) 310 consist of a Radio Network Controller 1 (RNC1) 315 linked to a Base Transceiver Station 1 (BTS1) 320 by communication link 319. RAN1 310 supports wireless communication with mobile stations or access terminals (e.g. cellular phones, smart phones, laptop computers, handheld terminals, palm pilot devices, etc.) within the coverage area of BTS1 320 (and any other linked Base Transceiver Stations). Radio Signal 311 links the Access Terminal 2 (AT2) 320 to the BTS1 320.

The RNC1 315 is coupled to the Core Network (CN) 340 network by communication link 314. The RNC1 315 is coupled to an Application Server (AS) 330, which is part of the CN 340, via the communication link 314. The RNC1 315 supports the transmission of voice and data communications on the cellular wireless network, and the RNC1 315 allows for the continuity of transmissions to and from AT1 325 as it roams the wireless network within the communication coverage of RNC1 315. The RNC1 315 will also control other components in the cellular sites to further support the transmission of voice and data on the wireless network. A packet scheduler is a functional component of the RNC1 315, and the RNC1 315 allocates system resources of time, code, or power to the packet data users. Collectively, the RNC1 315 and its associated components are called a Radio Access Network (RAN1 310), but the RNC1 315 can also be individually referred to as a RAN.

The AS 330 on the CDMA network 340 is also coupled to RNC2 350 by communication link 316. RNC2 350 is coupled to six BTSs as shown in FIG. 1. RNC2 350 is coupled to BTS2 360 by communication link 351. BTS2 360 is in turn coupled to AT2 365 by radio signal 361. RNC2 350 is also coupled to BTS3 370 by communication link 52. RNC2 350 is coupled to BTS4 375 by communication link 353, and BTS5 380 is also coupled to RNC2 350. RNC2 350 is coupled to BTS6 385 by communication link 355 and to BTS7 390 by communication link 356. BTS2 360 is configured to form zone 1 (Z1 391), and BTS3 370 is configured to form zone 2 (Z2 389). BTS4 375 is configured to form zone 3 (Z3 392), and BTS5 80 is configured to form zone 4 (Z4 388). BTS5 385 is configured to form zone 5 (Z5 393), and BTS7 390 is configured to form zone 6 (Z6 387). Collectively, Z1 391, Z2 389, Z3 393, Z4 388, Z5 393, and Z6 387 together with RNC2 350 form RAN2 399. The zones, or paging zones, can also be configured as cellular sites or sub-sites, which form a larger communication zone or access network that may or may not consist of a single cell for cellular communication.

Communications are initiated by paging an AT within these sub-sites or paging zones. The RNC2 350 supports the transmission of voice and data communications on the cellular wireless network, and the RNC2 350 allows for the continuity of transmissions to and from AT2 365 as it roams the wireless network within the communication coverage of RNC2 350. The RNC2 350 will also control other components in the cellular sites to further support the transmission of voice and data on the wireless network. A packet scheduler is a functional component of the RNC2 350, and the RNC2 350 allocates system resources of time, code, or power to the packet data users. Collectively, the RNC2 350 and its associated components (i.e., the BTS2 360, BTS3 370, BTS4 375, BTS5 380, BTS6 385 and BTS7 390) are called a Radio Access Network (RAN2 99), but the RNC2 350 can also be individually referred to as a RAN. Typically, a RNC supports communication within a single cellular coverage area, but as discussed above, other communication zones and coverage can be specified by the architecture. Although only one BTS is shown for each zone, multiple BTSs may be present.

In this implementing architecture for the second part of the invention, the configured paging zones are comparatively smaller. The AT2 365 updates the network with it location as it moves from zone to zone, enabling the network to locate the AT2 365 within a smaller zone. When the network learns that a user who is authorized to use a certain delay sensitive application has started the application and current paging zone is the big default paging zone, it will update the paging zone radius to a smaller one. FIG. 4 is a flow diagram showing the method to refine the paging zones to transmit the application data (e.g. a DoS packet) within of the invention. The method starts at step 401, when a user starts or ends a delay sensitive application. At step 405, the operator configures smaller paging or location zones within the RAN. The RAN learns the application is started or ended at the AT2. The RAN performs QoS negotiation with the AT if the user is authorized to use the application and runs algorithm to decide whether the paging zone should be updated. The decision is based on the current paging zone radius, the configured parameters that determine the preferred paging zone radius for the application, whether other delay sensitive applications are running at the time, and the configured parameters that determine the preferred paging zone radius for other applications. In step 410, the AT2 updates the network with location data when it changes paging zones. The smaller paging zones further define the location of the AT2 and localize the number of BTSs that must be included in broadcast.

In step 415, when the application data (e.g. a DoS packet) is received by the RNC2, the RNC2 broadcast it to a smaller zone. In FIG. 3, this zone is Z1 371. Dynamically adjusting the paging zone minimizes the impacts on the access channel (the signaling channel used by the AT to access a wireless network). The page zone can be adjusted dynamically for each incoming packet requiring a page. Paging zone radius is adjusted through the route update radius, which essentially determines how far an AT can travel before it reports its location to the network. When the paging zone becomes smaller, the AT2 is required to report its location more often due to its mobility, which results in more access attempts. The invention reduces the paging zone only for the users that are authorized to use real-time applications and only when the applications are launched or closed, which minimizes the impact to the access channel. Based on the number of BTSs present in a paging zone as well as the geographical size of the paging zone, the operator can configure the RAN such that the application data (e.g., as DoS packet) can be broadcast in the said paging zone with or without the page message.

Specifically, the 1 xEV-DO airlink standard utilizes Route Update Radius, which is a distance limit used by an access terminal (AT) to decide when to notify the RAN, or RNC, of its new location. Essentially, if the distance between the current serving sector and the sector in which the AT2 last updated its location is greater than the Route Update Radius, the AT notifies the RAN2 of its location by sending a RouteUpdate message. Each sector broadcast a parameter called RouteUpdateRadiusOverhead, which can be used by all ATs in the sector. Each AT can have its own Route Update Radius by modifying the RouteUpdateRadiusOverhead through two parameters called RouteUpdateRadiusMultiply and RouteUpdateRadiusAdd. The resulting Route Update Radius used by an AT is the RouteUpdateRadiusOverhead multiplied by RouteUpdateRadiusMultiply plus RouteUpdateRadiusAdd. The two parameters can be negotiated for each AT and updated using the Generic Attribute Update Protocol (GAUP) any time after a DO session is established.

In the invention, the RouteUpdateRadiusMultiply is set to 1 and the RouteUpdateRadiusAdd is set to 0 for all ATs initially. This causes all ATs to use the RouteUpdateRadiusOverhead as their Route Update Radius, and the paging zone radius for all ATs is based on this value for the RouteUpdateRadiusOverhead. When a user starts a real-time application, such as a PTT application, the AT will perform Quality of Service (QoS) negotiation with the RAN to configure the paging zone. If the user is authorized to use the application and the QoS negotiation is successful, the RAN will update its RouteUpdateRadiusMultiply and RouteUpdateRadiusAdd attributes for the AT using GAUP. The RouteUpdateRadiusMultiply and RouteUpdateRadiusAdd can be configured by the operators and the RouteUpdateRadiusMultiply can be set to a value less than 1 to reduce the final Route Update Radius. The paging zone for the AT can then be created based on the final Route Update Radius. In this way, the AT can set paging zone optimized for the application being used, such as one zone for PTT and another for VoIP.

For example, referring to FIG. 3, the paging zone can be a circular area centered at the sector that the AT2 last reports its location, and the paging zone radius can be the final Route Update Radius plus an offset. This offset can be different from the one used to define the paging zone based on RouteUpdateRadiusOverhead. This paging zone can be smaller than the paging zone that is based on RouteUpdateRadiusOverhead. For a network initiated application call, the RAN2 399 broadcasts the application data (e.g. a DoS packet) to this smaller paging zone. With this smaller paging zone, the number of sectors whose control channel are affected by the application data (e.g., a DoS packet) can be substantially reduced while achieving shorter call setup time. After the application is closed by the users, the AT2 365 will inform the RAN2 399 to release QoS resources. If no other real-time applications are running at that time, the RAN2 399 can restore the values to 1 and 0 for RouteUpdateRadiusMultiply and RouteUpdateRadiusAdd respectively, which changes the paging zone back to the original one based on the RouteUpdateRadiusOverhead, therefore reducing the access attempts.

Multiple paging zones can be established for the AT2 based on the final Route Update Radius but with different offsets. For example, two paging zones can be created with Offset1 and Offset2. For a network initiated call, RAN2 399 can send application data (e.g. a DoS packet) to the smaller paging zone (associated with Offset1) first. If no response is received within a period of time, RAN2 399 can page the AT2 in the larger paging zone (associated with Offset2). If the page fails again, RAN2 399 can then page the whole subnet (i.e., all the BTSs associated with the RNC2 350). Another option is to send application signaling to the smaller paging zone (associated with Offset1). At the same time, RAN2 399 also can also transmit a page to the sectors within the larger paging zone (associated with Offset2) but not include the sectors in the smaller paging zone. If no response is received within a period of time, RAN2 399 can page the AT2 over a zone larger than the paging zone based on the AT2's Route Update Radius, for example, a zone based on RouteUpdateRadiusOverhead. Similarly, the third re-try can be subnet wide (i.e., all the BTSs associated with the RNC2 350). When sending application data in the form of DoS, the network may decide to disable the DoS acknowledgement based on local policy.

Figure 5:
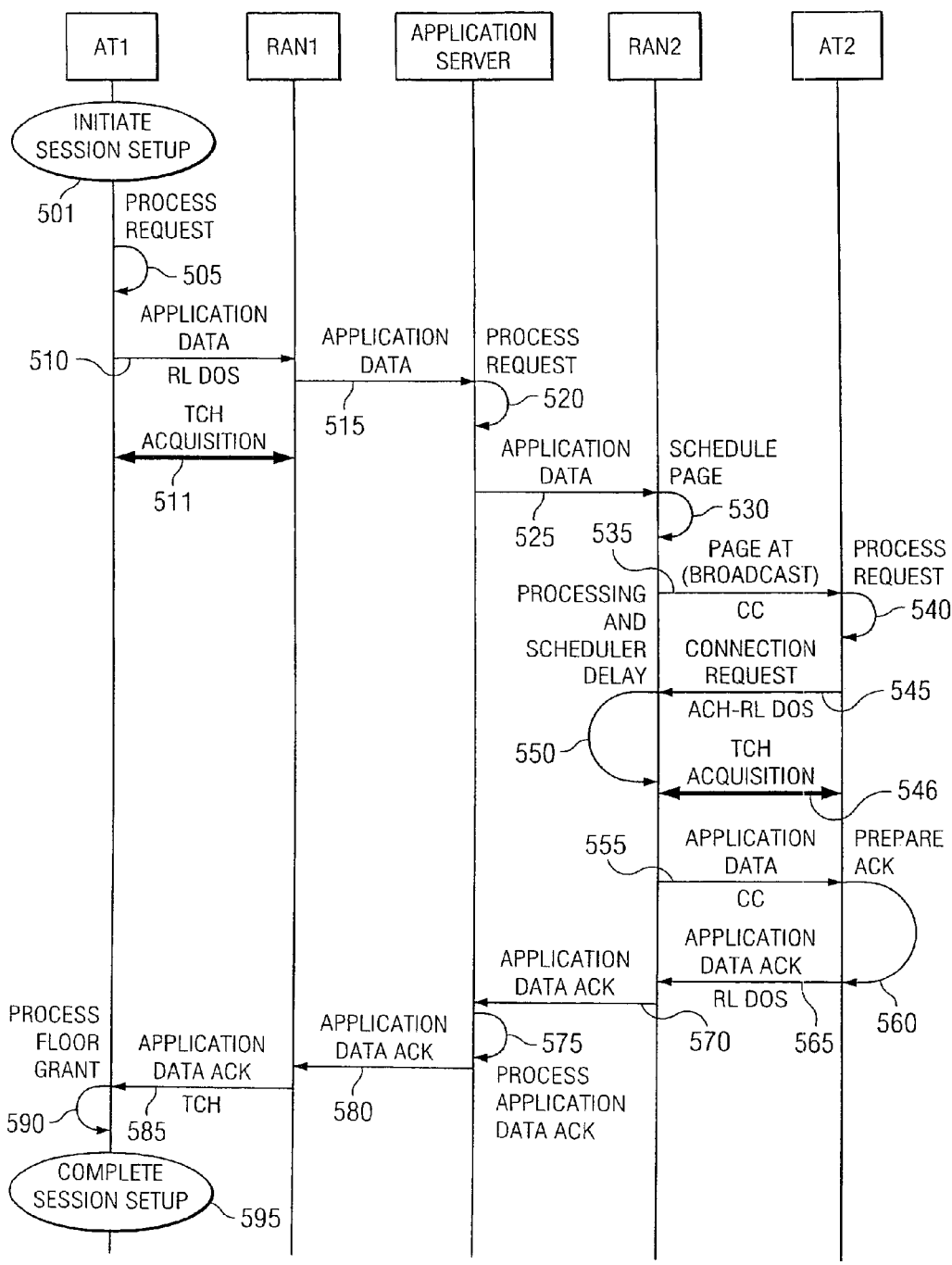
FIG. 5 is a communication flow diagram for the invention based on the CDMA architecture.

FIG. 5 shows a message flow implementing the invention. The process begins at step 501 to initiate session setup. At step 505, the AT1 initiates session setup by processing a communication request from the user. In step 510, application data is transmitted as a DoS packet to the RAN1. At step 511, traffic channel (TCH) acquisition is accomplished between AT1 and RAN1. In step 515, the application data is routed to the Application Server requesting a communication session. The Application Server processes the request at step 520, and in step 525, the application data is transmitted to the RAN2.

It is assumed that the RAN2 is aware generally that the target AT (e.g. AT2) is present within its coverage area. The smaller paging zones may be configured, and in the preferred embodiment the AT2 is roaming within the smaller paging zones as specified by the operator. In step 530, the RAN2 schedules a Page, and in step 535 it broadcast a Page to the paging zone (or zones) within which the AT2 is located, which in the preferred embodiment is a smaller configured page zone. The Page is broadcast using the control channel (CC). However, if smaller paging zones have not been configured, the broadcast will be made to additional BTSs within the RAN2 to which the AT2 may be coupled. In step 540, AT2 receives the Page and processes the request to respond with a Connection Request in step 545 over the access channel (ACH). DoS can be used for the connection request. This allows the AT2 to acquire a traffic channel in step 546 (TCH Acquisition). In step 550, the RAN2 processes the Connection Request and allocates resources with the Scheduler, resulting in delay while the TCH is allocated. In step 555, the application data is transmitted over the control channel (CC) in a DoS packet to the BTS that routed the Connection Request to the RAN2. In step 560, the AT2 prepares an application data acknowledge (ACK) message, and in step 564 transmits the Application Data Acknowledge (ACK) message to the RAN2, which can be in a DoS packet.

In step 570, the RAN2 routes the Application Data ACK message to the Application Server. In step 575, the RAN2 processes the Application Data ACK message and transmits it to the RAN1 in step 580. In step 585, the RAN1 transmits the Application Data over the TCH to the AT1, which processes the request Grant in step 590. This completes session setup at step 595.

While the invention has been particularly shown and described with respect to preferred embodiments, it will be readily understood that minor changes in the details of the invention may be made without departing from the spirit of the invention. Having described the invention, we claim:

The invention claimed is:

1. A method of operating a base station in a packet-based wireless communication system, the method comprising:
    receiving a page message and at least one application data packet associated with the page message, wherein said receiving the page message is based on the base station being selected for a dynamically adjusted paging zone for the page message, wherein the dynamically adjusted paging zone is adjusted to minimize impact on control channels of base stations, and wherein the dynamically adjusted paging zone is adjusted based on starting or stopping an application associated with the page message;
    broadcasting the page message on a control channel;
    when a response to the page message is received, transmitting the at least one application data packet; and
    when no response to the page message is received, not transmitting the at least one application data packet.

2. The method of claim 1, further comprising storing the received at least one application data packet.

3. The method of claim 2, further comprising discarding the stored at least one application data packet when no response to the page message is received within a predetermined time interval following broadcasting of the page message.

4. The method of claim 1, wherein transmitting the at least one application data packet comprises transmitting the at least one application data packet in at least one data-over-signaling packet over the control channel.

5. A base station for a packet-based wireless communication system, the base station comprising:
   a receiver operable to receive a page message and at least one application data packet associated with the page message, wherein receiving the page message is based on the base station being selected for a dynamically adjusted paging zone for the page message, wherein the dynamically adjusted paging zone is adjusted to minimize impact on control channels of base stations, and wherein the dynamically adjusted paging zone is adjusted based on starting or stopping an application associated with the page message; and
   a transmitter operable:
      to broadcast the page message on a control channel;
      to transmit the at least one application data packet when a response to the page message is received, and
      to not transmit the at least one application data packet when no response to the page message is received.

6. The base station of claim 5, further comprising at least one data store operable to store the received at least one application data packet.

7. The base station of claim 6, wherein the at least one data store is operable to discard the stored at least one application data packet when no response to the page message is received within a predetermined time interval following broadcasting of the page message.

8. The base station of claim 7, wherein the transmitter is operable to transmit the at least one application data packet by transmitting the at least one application data packet in at least one data-over-signaling packet over the control channel.

* * * * *